(12) United States Patent
Love et al.

(10) Patent No.: US 6,738,355 B1
(45) Date of Patent: May 18, 2004

(54) SYNCHRONIZATION METHOD FOR MULTI-PROBE COMMUNICATIONS NETWORK MONITORING

(75) Inventors: Simon Love, Edinburgh (GB); Graham S. Pollock, Cupertino, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 805 days.

(21) Appl. No.: 09/704,002

(22) Filed: Nov. 1, 2000

(51) Int. Cl.[7] .............................................. H04L 12/26
(52) U.S. Cl. ..................... 370/252; 370/244; 370/253; 709/224
(58) Field of Search ................................ 370/252, 253, 370/503, 244, 400, 389; 709/224

(56) References Cited

U.S. PATENT DOCUMENTS

| | | | | |
|---|---|---|---|---|
| 5,633,858 A | * | 5/1997 | Chang et al. | 370/255 |
| 6,426,943 B1 | * | 7/2002 | Spinney et al. | 370/235 |
| 2001/0050903 A1 | * | 12/2001 | Vanlint | 370/252 |
| 2002/0150093 A1 | * | 10/2002 | Ott et al. | 370/389 |

FOREIGN PATENT DOCUMENTS

| | | |
|---|---|---|
| EP | 0 726 664 | 10/1995 |
| GB | 2337903 | 5/1998 |
| GB | 2338147 | 3/1999 |
| WO | WO 88/04120 | 7/1987 |

OTHER PUBLICATIONS

Dharmapurikar, Sarang, et al; "Deep Packet Inspection using Parallel Bloom Filters"; Aug. 2003; IEEE; Proceedings 11th Symposium on High Performance Interconnects; pp. 44–51.*

Patents Act 1977—Search Report Under Section 17 dated May 21, 2002—1 page.

* cited by examiner

Primary Examiner—Seema S. Rao
Assistant Examiner—Robert C Scheibel

(57) ABSTRACT

A method of synchronizing the operation of a plurality of measurement probes enables multi-point measurements of a communications network. The method comprises the step of collecting data packets from a data stream of the communications network using the plurality of probes. The data packets are collected after a predetermined start time. The method further comprises the steps of determining a hash value array from an invariant portion of the sampled data packets, and comparing the hash value array to a start hash mask. Collection by a probe of a data packet that produces a hash value array that matches the start hash mask is used as a synchronization event. The method of the present invention allows multiple measurement probes observing the same data stream at different physical locations to be synchronized such that all of the probes observe the same set of packets being carried by the data stream. The method also allows statistical control over the frequency of packet matches within a data stream to the start hash mask. Moreover, the method of the present invention depends only on passive access to the physical links of the network. As such it will not degrade the performance or availability of the network.

19 Claims, 2 Drawing Sheets

US 6,738,355 B1

SYNCHRONIZATION METHOD FOR MULTI-PROBE COMMUNICATIONS NETWORK MONITORING

TECHNICAL FIELD

The invention relates to monitoring communications networks. In particular, the invention relates to synchronizing the operation of multiple measurement probes in a distributed communications network monitoring system.

BACKGROUND ART

Modern communications networks, especially those that carry broadband data over large distances, are often large, complex multi-nodal networks. The complexity of these modern networks often benefits from or even requires the utilization of a network monitoring system (NMS) to monitor the activity within and operation of the network. In particular, the NMS is used in many modern communications networks to assist in the coordination of the activities of the network, to locate and identify faulty equipment and/or problem channels, and to optimize the performance of the network.

As used herein, the term communications network refers to a collection of nodes or elements interconnected by a plurality of paths or communication channels. The communication channels carry data traffic or simply data from one node to another. Nodes may be either the source or destination of data traffic. When a node is acting as either a source or a destination (i.e. sink) for data, the node is often referred to as an endpoint or an end station. The data moving between a source and a destination node is referred to as a data stream. More than one data stream may exist between a pair of nodes at any given time.

In addition to nodes that are endpoints, networks may contain a plurality of nodes that act as switching elements. Switching elements or simply switches are nodes used for routing or relaying data streams from one communication channel to another within the network. As such, switches are responsible for dynamically routing data streams through the network from their source to their destination. Switching elements can also act as a source or destination of a data stream combining the switch and endpoint in a single node.

Since the purpose of a communications network is to communicate data from one point to another, the nodes of the network are usually remotely located from one another. In some networks, such as those employing earth orbiting satellites as nodes and/or those which carry data across continents, the distances between nodes can be very large.

Similarly, the NMS is generally a distributed system having multiple measurement points that are often separated by large distances. The network measurements performed by such a distributed NMS include single point measurements and multi-point measurements. A single point measurement is one in which all of the information produced by the measurement can be derived from the single measurement. The measurement of data rate at a given point in the network is an example of a single point measurement.

On the other hand, a multi-point measurement is one that consists of multiple sub-measurements taken at multiple, physically separated points in a network that are subsequently combined to yield a single measurement result. The network measurements produced by such multi-point measurements include but are not limited to such network parameters as 'network delay', 'delay variance', and 'dropped packet rate'. These network measurements are useful to the network operator in identifying service-affecting problems in the network as well as for optimization of the network operation.

Typically, an individual measurement probe performs each of the sub-measurements that make up a multi-point measurement. These measurement probes are each connected to or associated with one or more physical links in the network. Preferably, the connection is passive and does not interfere with normal network operation. As used herein, the term 'measurement probe' refers to a means for sampling or collecting data packets passing a given point in a network. Therefore, probes can take the form of an apparatus that is inserted into a network such as a conventional logic probe or can be a built-in apparatus that enables copies of packets to be routed to an auxiliary output or sample port of a node.

Given the distributed nature of the network being measured, the measurement probes are generally located at physically separated points within the network. Therefore, probes at separate physical locations in the network produce each of the sub-measurements. Moreover, the sub-measurements are indicative of the data traffic passing the probe location during a measurement time or interval.

Furthermore, since it is intended in a multi-point measurement that the sub-measurements ultimately be combined to yield a single measurement result, each sub-measurement must be performed in a manner that is, in some way, synchronized or coordinated with other sub-measurements. Generally this entails synchronizing multiple probes such that they observe and collect the 'same' set of packets when making a measurement. Thus, since the probes are located at different points in the network, they are observing the 'same' set of packets at different physical points in the network and potentially at different points in time as well. Often, in fact, it is desirable that all of the sub-measurements be made simultaneously in time across the network.

The term 'same', as used herein with reference to sets of data packets, means that if a pair of sets of data packets are collected from a given data stream, at least a predefined sub-set of the packets in each of the sets will match each other. In other words, the 'same' data is being observed at different points in the path of a data stream through a network. Conversely, if a pair of sets is collected with the intent of collecting the 'same' data and the sets are collected from two different data streams, in general, the pre-defined sub-sets within the sets will not match each other.

As noted above, normally for a multi-point measurement to be carried out successfully, the set of measurement probes and the sub-measurements that they produce must be synchronized to collect the 'same' packets. This form of synchronization is sometimes called packet synchronization to distinguish it from time-synchronization. Conventionally, the level of accuracy of the synchronization is a function of the network data rate among other things. However, in general, a high level of synchronization accuracy is typically required for meaningful multi-point measurements.

Achieving a sufficiently high level of synchronization accuracy can be challenging in many practical network implementations. In particular, networks with widely spaced nodes present an acutely difficult problem for synchronization of sub-measurements given the inherent propagation delay that may be observed between measurement probes. In the conventional NMS, sufficiently accurate synchronization is achieved only through the use of complex, usually expensive, equipment including highly accurate clocks associated with the measurement probes.

One conventional method of synchronization that achieves packet synchronization through precise time-synchronization is known as the time plus offset method. In the time plus offset method, each measurement probe maintains a local clock or other method of measuring a global time. The local clocks of the measurement probes are synchronized by using information regarding known propagation delay within the network. Typically, a first probe nearest the source of a data stream starts recording data at a time chosen in advance. A second measurement probe located at a remote point in the network subsequently begins its data recording activities at the chosen time plus an offset time. The offset time is determined such that it is equal to a known propagation time or delay from the point in the network where the first probe is located to the point in the network where the second probe is located. Since the offset is chosen to be equal to the propagation delay, the data recorded by the remote probe is time-synchronized to that of the first probe.

The drawback to this method is the need to know the precise propagation time or delay between probes. In many networks the propagation delay is not known and/or is variable. The time plus offset method cannot be applied if the propagation delays are either unknown or variable. In still other networks the propagation delay is among the parameters that are being measured by the NMS and so is not available a priori to synchronize the measurement probes. Even when propagation delay in a given network is both constant and known, the precision to which the delay is known may not be adequate to meet the needs of synchronization for the measurement probes of a multi-point measurement.

Another method of synchronization that is used with the measurement probes in conventional multi-point measurement systems known in the art is that of active synch traffic injection. In this method, synch traffic with well-known characteristics or a well-known profile is actively injected into the data stream being monitored. The measurement probes wait until the injected synch traffic is detected before they begin their respective recording activities.

An example of traffic that has a well-known profile is that incorporating a specific psuedo-random sequence. Another example of commonly used synch traffic often used in binary networks consists of a sequence or series of alternating one's and zeros that is injected into the data stream for a period of time. The choice of the specific synchronization sequence depends on the network but generally an attempt is made to choose a sequence that is not likely to occur by chance during normal network operation. Therefore, each probe will have a high degree of confidence that it has detected the test traffic when the sequence is recognized.

The primary disadvantage of the active synch traffic injection method is that it requires active access to the network. In addition, since network operation is generally suspended while the active traffic is being injected, this method can be disruptive to network operation. At the very least, the presence of the synch traffic prevents normal usage of the given data stream under test.

Thus, it would be advantageous to have a method for synchronizing the measurement probes participating in a multi-point measurement that does not require precise synchronization with respect to time between the measurement probes that perform the sub-measurements. In addition, it would be desirable for the method of synchronizing to be passive and neither require active access nor disrupt or degrade the normal network operation. Moreover, it would be desirable for the method of synchronization to be applicable to networks with variable propagation delays. Such method of multi-point measurement method would solve a long-standing need in the area of network monitoring systems.

SUMMARY OF THE INVENTION

A novel measurement probe synchronization method of the present invention enables multi-point measurements to be made upon sets of data packets observed at multiple locations in a network. The synchronization method of the present invention reduces the need for precise time-synchronization of the measurement probes utilized by the monitoring system. The method of the present invention is passive and does not require active access to the network and will not degrade the performance of the network.

The measurement synchronization method of the present invention utilizes a novel 'start hash mask' to trigger the beginning of data packet collection by measurement probes of a network monitoring system. The start hash mask is derived from observations of normal traffic data in the network. The start hash mask is chosen such that it occurs statistically infrequently in a random data stream and thus can function as a 'rare event' trigger.

The method of synchronizing measurement probes of a multi-point measurement of the present invention comprises the steps of deterministically sampling or collecting data packets from a data stream after a start time; determining one or more hash values from invariant portions of the collected data packets; and comparing the hash value(s) to a start hash mask. Following the recognition of the 'start hash value' by virtue of it being a hash value or set of hash values that matches the start hash mask, the measurement probes begin sub-measurement data packet collection from the data stream for the multi-point measurement.

The method of the present invention reduces the need for precise time-synchronization between the probes by using the start hash mask matching event to trigger the onset of sub-measurement data collection by the measurement probes. The method of the present invention allows multiple measurement probes observing the same data stream at different physical locations to be synchronized such that all of the probes observe the same set of packets being carried by the data stream. Moreover, the method of the present invention depends only on passive access to the physical links of the network. As such, it will not degrade the performance or availability of the network.

BRIEF DESCRIPTION OF THE DRAWINGS

The various features and advantages of the present invention may be more readily understood with reference to the following detailed description taken in conjunction with the accompanying drawings, where like reference numerals designate like structural elements, and in which.

MODES FOR CARRYING OUT THE INVENTION

The present invention is a method 100 of synchronizing the collection and recording activities of a plurality of measurement probes participating in a multi-point measurement of a communications network monitoring system. Measurement probes collect and record data in the form of data packets taken from data streams in a communications network. The multi-point measurement is predicated on the assumption that the data collected and recorded by the probes is taken from the data streams at a point in time in terms of a time reference frame of the data stream. By synchronizing the packet collection to the time frame of the stream, the data recorded by one probe can be meaningfully compared to that taken by other probes participating in the multi-point measurement. In short, each probe must be able to time-coordinate its individual packet collection and recording activities so that the same data is being recorded by all of the probes monitoring a given data stream. The method 100 of synchronization of the present invention is individually employed by each of the probes and enables probes that are remote from one another to perform collection and recording that insure the same data is being collected by each probe.

Figure 1:
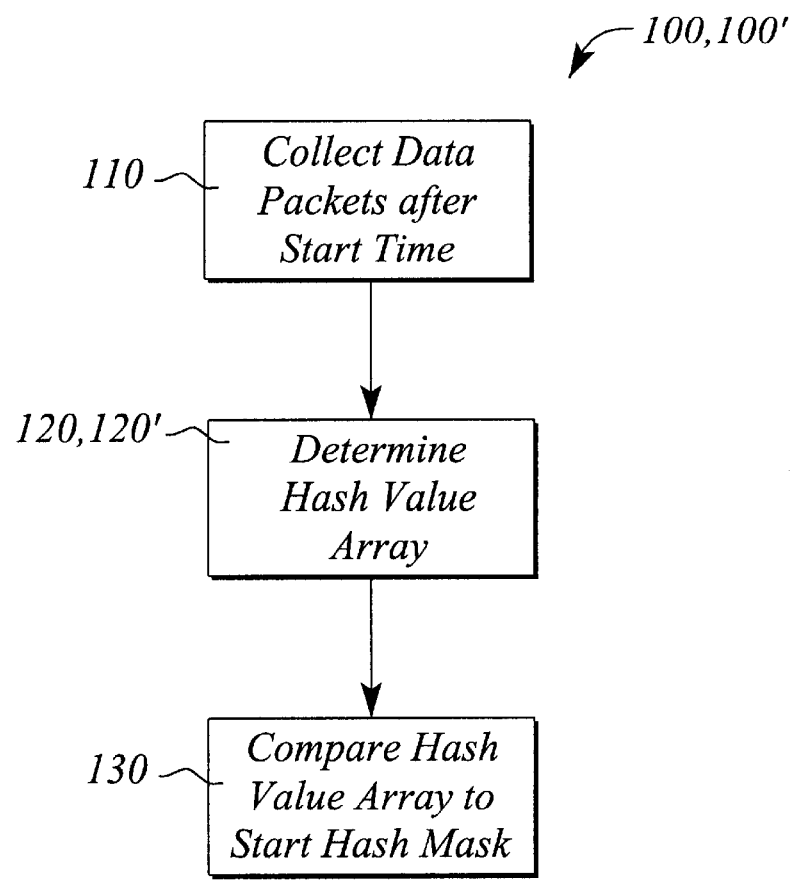
FIG. 1 illustrates a block diagram of the method of synchronizing measurement probes in a multi-point measurement in a network monitoring system of the present invention.

FIG. 1 illustrates a block diagram of the method 100 of synchronizing of the present invention. The method 100 of synchronizing comprises the step of collecting data packets from a data stream with a plurality of measurement probes. The step of collecting 110 begins after a start-time. Preferably the start-time is time-coordinated among all of the probes participating in the multi-point measurement and is based on a local clock maintained by each of the probes. By 'time-coordinated' it is meant that each of the probes starts the step of collecting 110 at approximately the same time. In order to time-coordinate the measurement probes they must each be instructed when to begin collecting packets. The time at which collection should begin, or the start time, can be either communicated to the probes explicitly or implicitly.

For example, at some time prior to the start time a message or signal is sent to all probes instructing them to start collecting 110 at an appointed start time according to their respective local clocks. Then each probe starts collecting 110 after the start time occurs. This is an example of an explicit start time. Alternatively, a message or signal may be sent out to all probes instructing them to simply start collecting 110. Upon receipt of the message, the probes begin collecting 110. This is an example of an implicit start time. In the case of an implicit start time, the time at which the probe starts collecting is interpreted as the time at which the probe receives the message. One skilled in the art would readily identify other implicit and explicit forms of a start time. All such implicit and explicit start times are considered to be within the scope of the present invention.

In the preferred embodiment, the measurement probes accomplish the step of collecting 110 in a passive, non-invasive manner. An example of a measurement probe utilized in performing passive collection in typical communications networks is a high impedance logic probe. The high impedance logic probe can be connected directly to one of the transmission wires of the network and collect copies of the data packets in the network without interfering with the normal traffic flow. In another example for a different network, the probe might be an inductively or capacitively coupled logic probe. In yet another example, the probes might be built into the logic circuitry of the nodes such that copies of raw data packets are fed to an output port on the node. A variety of different probes may be used on a single network as deemed appropriate. One skilled in the art would readily be able to determine an appropriate probe 102 to use for a given network without undue experimentation. All such probes are considered to be within the scope of the present invention.

Figure 3:
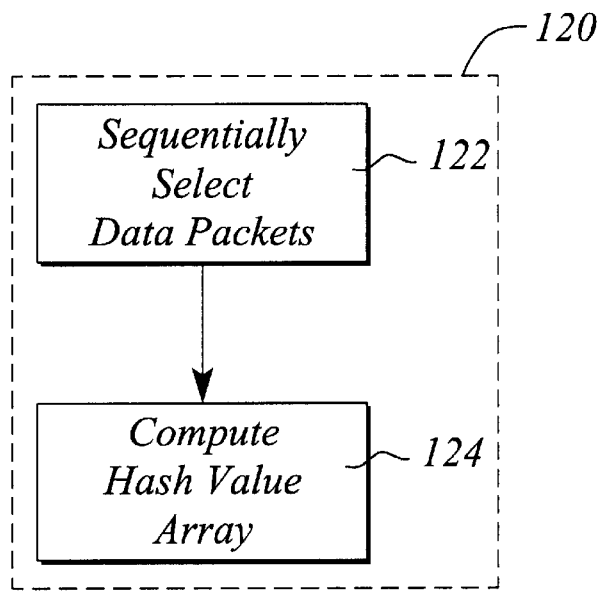
FIG. 3 illustrates a block diagram of one embodiment of the step of determining the hash values of the present invention.

The method 100 further comprises the step of determining 120 a hash value array from an invariant portion of the collected data packets. In one embodiment, the step of determining 120 a hash value array comprises the step of sequentially selecting 122 data packets from the collected data packets to form a selected set of data packets. The selected set of data packets has one or more data packets. The step of determining 120 hash values further comprises the step of computing 124 a hash value from an invariant portion of each of the selected packets, thereby producing an array or string of hash values, one hash value for each data packet in the selected set. FIG. 3 illustrates a block diagram of the step of determnining 120 a hash value array.

Figure 2:
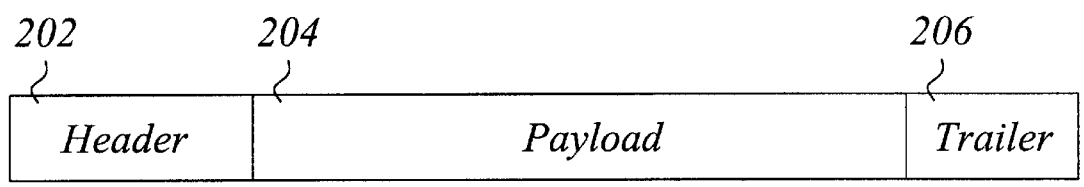
FIG. 2 illustrates a structure of a typical data packet found in a data stream of a communications network.

Data packets carried by the data streams of communications networks generally have a well-defined structure. Typically, the data packet structure consists of a header 202, a payload 204, and a trailer 206. The header 202 usually includes routing or destination information as well as a packet identification label. The payload 204 portion contains the data being carried by the packet. Among other things, the trailer 206 often contains some form of error correction code (ECC) information used to insure that the packet arrives at its destination without errors as well as a termination mark indicating the end of the packet. This basic packet structure is illustrated in FIG. 2.

Often, as a given data packet passes through the network, fields within the header 202 and trailer 206 are modified by the switching elements of the network. However, in all networks there are portions of the data packets that are not intentionally altered or modified while passing through the network. These unaltered portions of the packet are known as the invariant part or portion of the packet.

There are several approaches to performing the step of sequentially selecting 122 data packets from the collected data packets. For example, every data packet that is collected following the start time may be selected as it is sampled. Alternatively, the step of sequentially selecting 122 may involve selecting only every j-th collected data packet (j≧2). For example, if j=3, a first collected data packet will be selected. The selection 122 process will then skip a second and a third data packet and select a fourth data packet. The selection 122 process then repeats. Many other selection approaches are possible that would be readily apparent to one skilled in the art. All such selection approaches are considered to be within the scope of the present invention.

The hash values are computed in the step of computing 124 from the invariant part of the selected data packets. As referred to herein, a 'hash value' is a numeric value that is a function of the values contained in the invariant part of a packet. There are many different algorithms available and known in the art for generating hash values. These algorithms are collectively known as hashing algorithms or hashing functions. For example, a simple hashing function algorithm sometimes called the "exclusive-Or" or XOR hash function can be used for producing a hash value from the invariant part of a data packet. Among some other well-known hashing algorithms that are useful are 'Prime-number division remainder', 'digit extraction', 'folding', 'radix conversion', and 'Mid-square'. One skilled in the art would readily be able to determine an adequate hashing function without undue experimentation. All such hashing functions are considered to be within the scope of the present invention.

The XOR hash function utilizes a k-bit exclusive-Or (XOR) operator to produce a k-bit hash value from the data being hashed. In particular, the invariant part of the data packet, referred to herein as the 'hashed data', and represented in a binary format, is first divided into an array of N, k-bit segments (e.g. 8-bit for k=8). A so-called 'running hash value', initially set to zero, is then combined using an XOR operator with a first k-bit segment from the array. The resulting k-bit running hash value is then combined with a second k-bit segment using the XOR operator. Each of the k-bit segments of the hashed data is used in succession until all k-bit segments of the hashed data have been combined with the running hash value using the XOR operator. Finally, after all of the N, k-bit segments have been used, the k-bit running hash value becomes the hash value representing the hashed data. The XOR operator, as used herein, is the conventional binary XOR defined by the following table:

| X | Y | X XOR Y |
|---|---|---------|
| 0 | 0 | 0 |
| 0 | 1 | 1 |
| 1 | 0 | 1 |
| 1 | 1 | 0 |

The hash value for a packet is not a unique representation of that packet. That is to say, data packets with different contents can be represented by the same hash value. However, the hash value calculated for a given data packet with a fixed content will always be the same value each time the hash value is calculated. In addition to the hashing algorithm, there is a choice of precision available with respect to the size of a packet's hash. Typically hash values are based on either an 8-bit or 16-bit precision. Varying the precision allows the user to modify some of the characteristics of hash value used. In particular, varying the precision will affect the amount of storage used to hold the hash values and the relative uniqueness of each hash value. The relative uniqueness refers to the probability that two randomly chosen data packets will produce the same hash value.

In general, traffic carried by a data stream is random or nearly random. This is particularly true for the invariant portions of the data packets in the data stream. If the traffic carried by a data stream is assumed to be random, then hash values that are produced by hashing successive packets will occur with equal probability. In other words, the probability that a given hash value will be produced by hashing the invariant portion of the data packets in a typical data stream is 1/n where n is the number of possible hash values that can be produced for a given hash precision and hash algorithm. Similarly, the probability that two consecutive packets in a data stream have the same hash value is $(1/n)^2$. By extension, the probability that m consecutive packets in a data stream have the same hash value is $(1/n)^m$. Furthermore, if a data stream is observed and hashed for a long enough period of time, all possible hash values will be produced.

The method 100 further comprises the step of comparing 130 the hash value array to a pre-determined start hash mask. The start hash mask is an expression or filter that is selected prior to employing the method 100 of the present invention. In particular, the start hash mask is an array of values corresponding to a specific hash value array that may be produced in the step of determining 120. In other words, a start hash mask is a specific realization of the hash value array that is chosen from among all possible realizations that can occur in a random data stream. Selection of the specific start hash mask is arbitrary. The start hash mask is chosen prior to its utilization in method 100 and is communicated to all measurement probes participating in a multi-point measurement. Moreover, all probes performing the method 100 for a given multi-point measurement use the same start hash mask.

Each hash value array that is determined in the step of determining 120 is sequentially compared in the step of comparing 130 to the start hash mask. The step of comparing 130 continues by sequentially comparing individual hash value arrays until a match is found. In particular, a current hash value array is compared to the start hash mask. If the hash value array matches the start hash mask during the step of comparing 130, synchronization is triggered or initiated. If the hash value array and start hash mask do not match, a next hash value array is compared to the start hash mask. The step of comparing 130 continues comparing subsequent hash value arrays until a match is located.

A match between the start hash mask and a given hash value array (determined in the step of determining 120) indicates with a known probability that a given portion of the data stream is now present at the measurement probe. The probe can now begin collecting and recording data for use in the multi-point measurement. If all probes monitoring a data stream employ the aforementioned method 100, all probes will begin collecting and recording data synchronously at the same point in the data stream and the data collected will be the same data.

The method 100 of the present invention is based on the idea that in a random or nearly random data stream, there is a known probability of computing a given hash value array from the invariant portion of a given set data packets for a given hashing algorithm. Hashing algorithms are designed and/or chosen with this property in mind. Moreover, the probability that two different sets of data packets will produce the same hash value array is also well known and controllable for a given hashing algorithm.

Therefore, if all measurement probes start searching for a match between a given hash value array and the start hash mask at approximately the same time, the probability of a matching error can be controlled and even made arbitrarily small by controlling the size or length of the start hash mask. The probability of a matching error is the probability that two non-identical sets of data packets will hash to the same hash value array. Similarly, the probability of finding a data packet in a random data stream that produces a hash value array that matches the start hash mask can also be controlled by the size of the start hash mask. The longer the mask, the lower the probability of finding a match in a random data stream and the longer the time interval between matches will become. One skilled in the art would be able to choose an appropriate start hash mask size that balances the probability of a matching error with that of the probability of finding a match without undue experimentation.

Moreover, the relationship between the size of the start hash mask and the probability of finding a match in a random data stream can be a useful attribute in some cases. For example, consider the case of a multi-point measurement to be carried out on a single data stream. The start hash mask can be chosen so that there is a high probability that the time taken to get a match is greater than the propagation delays between the measurement probes. Correspondingly, this will increase the probability that the synchronized measurement probes are monitoring the same set of packets in the data stream.

In addition to the choice of the size of a start hash mask, there are several possible choices available over the degree to which the hash value array must match with the start hash mask before measurement recording begins. That is to say, the match between a particular hash value array and the start hash mask need not be exact for the method 100 of the present invention to work. In some cases it may be advantageous to allow a match to be declared when only a portion of the start hash mask matches a given hash value. For example, in some instances it may be advantageous to declare some portions of the start hash mask to be 'unimportant'. This is analogous to the concept of 'don't care' conditions in binary logic. Basically if a hash value array being examined matches that start hash mask except in the 'don't care' portions, a match is declared.

Figure 4:
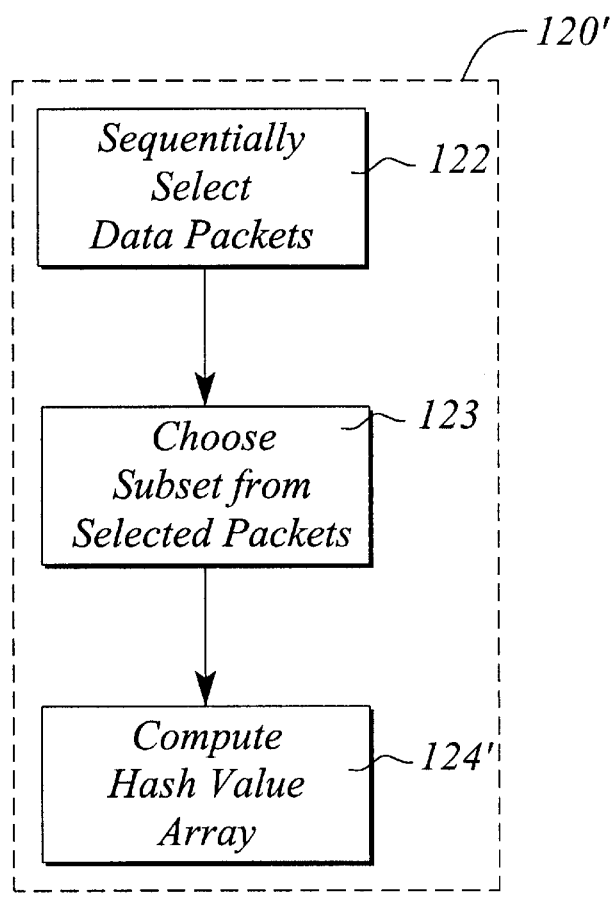
FIG. 4 illustrates a block diagram of another embodiment of the step of determining the hash values of the present invention.

In another embodiment, the method 100' of synchronizing comprises the step of determining 120' a multi-packet hash value array. The step of determining 120' comprises the step of selecting 122 data packets from the collected data packets. The step of determining 120' further comprises the step of choosing 123 subsets of the selected data packets. The step of determining 120' further comprises the step of computing 124' hash values for each of the subsets, one hash value for each subset. The set of hash values computed in the step of computing 124' is then designated the multi-packet hash value array. FIG. 4 illustrates a block diagram of the step of determining 120' hash values according to the method 100' of the present invention.

The methods 100, 100' of the present invention reduce the need for precise time-synchronization between the probes by using the start hash mask matching event to trigger the onset of synchronous sub-measurement data collection by the measurement probes. In effect, two parameters, namely a relatively coarse time and the matching event, are used to synchronize data measurement or recording by the probes. This is in contrast to the use of one parameter, namely precise time in conventional synchronization methods. The effect is a substitution of two less precise events for one precisely timed event to achieve the same overall result. Therefore the methods 100, 100' of the present invention can result in a less complex, less costly NMS.

The methods 100, 100' of the present invention allow multiple measurement probes observing the same data stream at different physical locations to be synchronized such that all of the probes observe the same set of packets being carried by the data stream. The methods 100, 100' also allow statistical control over the frequency of packet matches within a data stream to the start hash mask. In particular, the probability that a particular hash value that matches the start hash mask is produced from a given set of data packets is well defined for randomly distributed traffic in a data stream. Therefore, it is possible to virtually guarantee that a match will occur within a specified period. Moreover, the methods 100, 100' of the present invention reduce the sensitivity of measurement probe synchronization to the propagation delays inherent in communications networks.

Moreover, the methods 100, 100' of the present invention depend only on passive access to the physical links of the network. As such, it will not degrade the performance or availability of the network. Furthermore, the methods 100, 100' of the present invention allow a set of measurement probes participating in a multi-point measurement on the same data stream to synchronize their respective activities such that they will have a quantifiable statistical probability that they will be able to carry out their measurements on the same set of packets.

Thus there has been described novel methods 100, 100' for synchronizing the operation of measurement probes used in multi-point measurements performed by communications network monitoring systems. It should be understood that the above-described embodiments are merely illustrative of the some of the many specific embodiments that represent the principles of the present invention. Clearly, those skilled in the art can readily devise numerous other arrangements without departing from the scope of the present invention.

What is claimed is:

1. A method of synchronizing a plurality of measurement probes participating in a multi-point measurement of a communications network having data streams carrying data packets, each of the data packets having an invariant portion, the method comprising the steps of:

collecting data packets from a data stream after a start time;

determining a hash value array from the invariant portion of the collected data packets; and comparing the hash value array to a start hash mask until a match occurs, thereby triggering synchronization.

2. The method of claim 1, wherein in the step of comparing, the occurrence of the match between the hash value array and the start hash mask synchronizes the plurality of probes to initiate the multi-point measurement.

3. The method of claim 1, wherein the step of determining the hash value array comprises the steps of:

sequentially selecting data packets from the collected data packets to form a selected set; and computing hash values of the array from the invariant portions of each of the packets of the set, wherein one hash value is computed for each of the selected packets.

4. The method of claim 3, wherein the step of sequentially selecting data packet comprises the steps of first selecting a data packet from the collected data packets; skipping one or more data packets of the collected data packets; thereafter selecting another data packet; and repeating the steps of skipping and thereafter selecting until the selected set is complete.

5. The method of claim 3, wherein the step of computing uses an XOR hash algorithm.

6. The method of claim 1, wherein the hash value array has one or more elements and the start hash mask has one or more elements, and wherein the match occurs when the one or more elements of the hash value array are the same as corresponding one or more elements of the start hash mask.

7. The method of claim 1, wherein the hash value array has one or more elements and the start hash mask has one or more elements, and wherein a match occurs when a subset of the elements of the hash value array are the same as a corresponding subset of the elements of the start hash mask.

8. The method of claim 1, wherein the step of determining the hash value array comprises the steps of:

sequentially selecting data packets from the collected data packets;

choosing subsets of the selected data packets; and computing hash values of the array from the invariant portions of the packets in each of the subsets, wherein one hash value is computed for each subset.

9. The method of claim 8 wherein the step of computing uses an XOR hash algorithm.

10. The method of claim 8, wherein the step of sequentially selecting data packet comprises the steps of first selecting a data packet from the collected data packets; skipping one or more data packets of the collected data packets; thereafter selecting another data packet; and repeating the steps of skipping and thereafter selecting until the selected set is complete.

11. A method of synchronizing a plurality of measurement probes to measure a specific data packet from a communications network, the network having a data stream carrying data packets, each of the data packets having an invariant portion, the method comprising the steps of:

collecting the data packets from the data stream after a start time;

determining a hash value array from the invariant portion of the collected data packets; and comparing the hash value array to a start hash mask until a match occurs to initiate the synchronous measurement of the specific data packet by the plurality of probes.

12. The method of claim 11, wherein the step of determining the hash value array comprises the steps of:

sequentially selecting data packets from the collected data packets to form a selected set; and computing hash values of the array from the invariant portions of each of the packets of the set, wherein one hash value is computed for each of the selected packets.

13. The method of claim 12, wherein the step of sequentially selecting data packet comprises the steps of first selecting a data packet from the collected data packets; skipping one or more data packets of the collected data packets; thereafter selecting another data packet; and repeating the steps of skipping and thereafter selecting until the selected set is complete.

14. The method of claim 12, wherein the step of computing uses an XOR hash algorithm.

15. The method of claim 11, wherein the hash value array has one or more elements and the start hash mask has one or more elements, and wherein the match occurs when the one or more elements of the hash value array are the same as corresponding one or more elements of the start hash mask.

16. The method of claim 11, wherein the hash value array has one or more elements and the start hash mask has one or more elements, and wherein a match occurs when a subset of the elements of the hash value array are the same as a corresponding subset of the elements of the start hash mask.

17. The method of claim 11, wherein the step of determining the hash value array comprises the steps of:

sequentially selecting data packets from the collected data packets;

choosing subsets of the selected data packets; and computing hash values of the array from the invariant portions of the packets in each of the subsets, wherein one hash value is computed for each subset.

18. The method of claim 17 wherein the step of computing uses an XOR hash algorithm.

19. The method of claim 17, wherein the step of sequentially selecting data packet comprises the steps of first selecting a data packet from the collected data packets; skipping one or more data packets of the collected data packets; thereafter selecting another data packet; and repeating the steps of skipping and thereafter selecting until the selected set is complete.

* * * * *